United States Patent Office 3,247,863
Patented Apr. 26, 1966

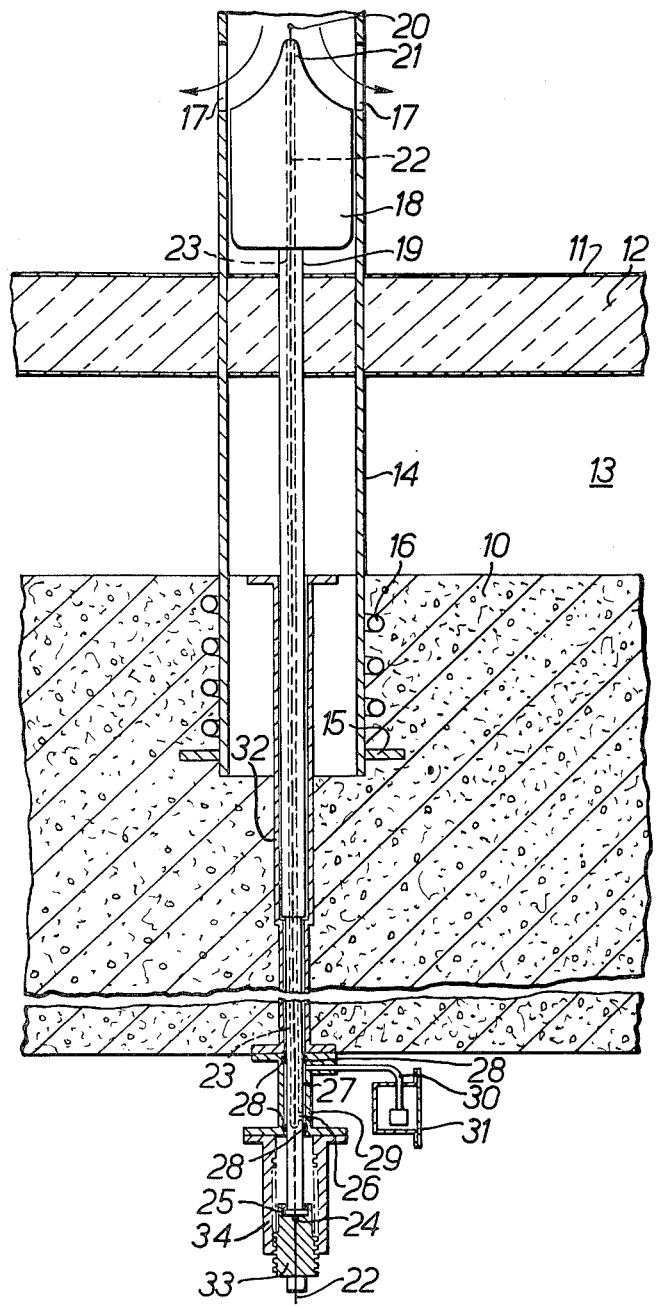

3,247,863
VALVES
Ernest Edward Jerkins, Warrington, England, assignor to United Kingdom Atomic Energy Authority, London, England
Filed May 22, 1963, Ser. No. 282,298
Claims priority, application Great Britain, June 4, 1962, 21,435/62
4 Claims. (Cl. 137—340)

This invention relates to valves for fluid flow and is treated below in its application to valves for use in nuclear reactors for regulating the flow of reactor coolant in fuel channels in the reactor. A valve used in this context is customarily referred to as a "gag-valve."

According to the present invention a fluid flow valve housing a closure member has a stem for moving said closure member, said stem being adapted for conducting fluid samples and temperature sensing signals from the valve.

The valve according to another aspect of the invention has a valve closure member movable by a hollow stem, temperature sensitive means carried on the valve closure member in a region exposed to fluid flow through the valve, means allowing fluid in the valve to pass into the hollow stem, a cable connecting with the temperature sensitive means extending along the hollow stem and passing out from the hollow stem via a gland, a closure member for the hollow stem at its end remote from the valve closure member and a sampling pipe connecting with the hollow stem.

In the application of valves according to the invention to a nuclear reactor contained within a concrete pressure vessel, the hollow stem is arranged inside a liner tube which penetrates and is sealed into the vessel wall. The valve member moves inside a tube which accepts coolant from the reactor core and discharges it through ports in the walls of the tube into a collecting chamber, the valve member moving to restrict or open the ports.

The invention will now be further described with reference to the accompanying drawing which is a sectional elevation.

A nuclear reactor has a concrete pressure vessel 10 and inside the vessel 10 there is a hot gas collection box 11 lined with thermal insulating material 12. A space 13 exists between the box 11 and vessel 10 in which cool gas exists.

The core of the reactor is carried on a number of support tubes 14 having flanges 15 to transmit their load to the vessel 10. The tubes 14 are provided with cooling tubes 16 through which water is circulated and ports 17 exist to allow discharge of reactor coolant gas into the box 11.

The tube 14 shown in the drawing is equipped with a valve according to the invention. There is a valve member 18 movable by a hollow stem 19. The member 18 carries a thermocouple hot junction 20 at the nose 21 of the member 18. A cable 22 extends from the junction 20 along the bore 23 of the stem 19. The cable 22 leaves the stem 19 at a gland 24 located in a stem closure member 25. A port 26 exists in the stem 19 which allows gas in the bore 23 to pass into an annulus 27 defined by two high pressure gas seals 28 and tube 29. A sampling pipe 30 connects with the annulus 27 and leads away to burst cartridge detection apparatus 31.

The stem 19 passes through a stepped liner tube 32 in the wall of the vessel 10 and is movable outwardly by pressure acting on it from the reactor and inwardly by a screw 33 acting in a threaded tube 34.

In an alternative construction the valve member 18 is rotatable in the tube 14, is hollow and has ports arranged so that in one operable position the ports 17 are obturated by the member 18 and during rotation of the member to a second operable position in which the ports of the member coincide with the ports 17 the latter are progressively opened.

The valve according to the invention enables the openings of the ports 17 to be varied to suit reactor operating conditions, adjustment being made from outside the reactor pressure vessel 10 by means of the screw 33 (or by simple rotation of the hollow stem of the alternative construction) and at the same time provides for measurement of the temperature and extraction of samples of the gas passing through the ports.

I claim:
1. A fluid flow valve comprising:
a tube having an open end for defining a fluid inlet port, a closed end and at least one aperture in its wall for defining a first fluid outlet port;
a valve member slidable longitudinally within said tube and capable of occupying any selected position ranging from a first limiting operating position wherein said aperture is obturated to a second limiting operating position wherein said valve member is disposed between said aperture and said closed end;
a stem attached to said valve member and extending co-axially along said tube from a first end of said valve member which is remote from said aperture and penetrating said closed end of said tube;
sealing means in said tube and co-operating slidingly with said stem to define an annular chamber;
means associated with said tube and said stem for effecting positioning of said valve member in any selected position as aforesaid;
means defining a bore extending from a second end of said valve member through the valve member and said stem into said chamber when the valve member occupies any selected position as aforesaid;
means defining a second fluid output port extending from said chamber to outside of said tube;
temperature sensitive means supported in said tube by said second end of said valve member;
and signal conducting means extending through said valve member, said stem and said closed end of said tube for conducting temperature variation sensing signals from said temperature sensitive means;
whereby said second fluid outlet port serves to provide a connection for fluid test equipment, and said signal conducting means can be connected to temperature indication means capable of being operated by conducted signals from the temperature sensitive means.
2. A fluid flow valve comprising:
a first tube having an open first end for defining a fluid inlet port, a second end and at least one aperture in its side wall for defining a first fluid outlet port;
a valve member slidable longitudinally within said first tube and capable of occupying any selected position ranging from a first limiting operating position wherein said aperture is obturated to a second limiting operating position wherein said valve member is disposed between said aperture and said second end of the tube;
a hollow stem attached at a first end thereof to a first end of said valve member which is remote from said aperture, said stem extending co-axially along said tube to a closed second end of said stem;
a second tube sealably connected to said second end of said first tube and bounding an annular chamber about said hollow stem;
means associated with said second tube and said hollow stem for effecting positioning of said valve member in any selected position as aforesaid;
means defining a bore extending through the valve member from a second end thereof to communicate with the interior of the hollow stem;

means defining an aperture in said hollow stem communicating with said chamber when said valve member occupies any selected position as aforesaid;

a branch pipe on said second tube defining a second fluid outlet port from said annular chamber;

a thermocouple hot junction supported by said second end of said valve member and having conductors extending through said valve member, said hollow stem and said second closed end of said hollow stem to outside said first and second tubes;

and a flange for the attachment of said first tube to a vessel wall, the valve member being situated within the vessel and said first tube extending through the vessel wall.

3. A fluid flow valve according to claim 2 wherein the means associated with said second tube and said hollow stem for effecting sliding of said valve member comprises a screw and nut mechanism, the screw of said mechanism being in abutment with said second closed end of said hollow stem.

4. In a nuclear reactor, means for controlling, sampling and measuring the temperature of fluid flow comprising:

a vessel for confining fluid;

at least one first tube extending through a wall of the vessel;

a stem extending through and slidable within said first tube;

a valve member supported within the vessel at one end of said stem;

a second tube having an end supported within and by said vessel wall and disposed co-axially with said valve member and said stem, said second tube having an open end remote from said vessel wall for accepting fluid and at least one aperture in its side wall for discharging fluid, said aperture being disposed so that in one limiting operating position of said valve member the aperture is obturated and in a second limiting operating position of said valve member said valve member is disposed between said aperture and said second tube;

a third tube disposed outside the vessel and attached to said first tube and co-axial with said stem;

spaced gland sealing means for defining a chamber bounded by said third tube, said stem, and said gland sealing means;

a branch pipe defining a fluid outlet port from said chamber;

means defining a duct extending through said valve member and said stem to connect the open end of said second tube with said chamber;

a thermocouple hot junction supported in said second tube by said valve member and having conductors extending through said valve member, said stem, and sealingly through the end of said stem which is external of said vessel; and a screw thread mechanism for effecting sliding of said stem and said valve member between said first and second operating positions, the screw of said mechanism being in abutment with the end of said stem which is outside of said vessel wall.

References Cited by the Examiner

UNITED STATES PATENTS

| | | | |
|---|---|---|---|
| 1,808,092 | 6/1931 | Wimmer | 137—551 |
| 2,116,626 | 5/1938 | Guildford | 137—596 |
| 2,922,305 | 1/1960 | Wehrman | 73—359 |

M. CARY NELSON, *Primary Examiner.*

HENRY T. KLINKSIEK, *Examiner.*